United States Patent [19]
Briat et al.

[11] Patent Number: 4,734,310
[45] Date of Patent: Mar. 29, 1988

[54] SHEET OF ARTIFICIAL LEATHER MADE OF POLYVINYL CHLORIDE, THE BACK OF WHICH IS COATED WITH A DRY ADHESIVE CAPABLE OF BEING ACTIVATED BY HEAT, AND USE OF THIS SHEET FOR THERMOCOVERING OF RIGID ARTICLES

[75] Inventors: Robert Briat, Sugny; Léon Latour, Brussels, both of Belgium

[73] Assignee: Solvay & Cie, Brussels, Belgium

[21] Appl. No.: 865,117

[22] Filed: May 20, 1986

[30] Foreign Application Priority Data

May 28, 1985 [FR] France ................. 85 08086

[51] Int. Cl.$^4$ .......... D06N 7/04; C09J 3/14; C09J 3/16
[52] U.S. Cl. .................... 428/151; 428/904; 156/331.4; 156/331.7
[58] Field of Search .............. 428/151, 424.6, 904; 156/331.4, 331.7, 324.4

[56] References Cited

U.S. PATENT DOCUMENTS

| 2,891,876 | 10/1959 | Brown et al. | 428/424.6 |
| 3,373,143 | 2/1968 | Chilvers et al. | 428/424.6 |
| 3,428,609 | 2/1969 | Chilvers et al. | 156/331.7 |
| 3,490,987 | 1/1970 | Bauriedel et al. | 156/331.4 |
| 3,503,934 | 3/1970 | Chilvers et al. | 156/331.7 |
| 3,518,103 | 6/1970 | Visnovsky | 428/424.6 |
| 3,676,201 | 7/1972 | Doss et al. | 428/424.6 |
| 3,779,794 | 12/1973 | De Santis | 156/33.4 |
| 4,175,161 | 11/1979 | Fogle et al. | 156/331.4 |
| 4,384,083 | 5/1983 | Baker | 428/424.6 |

Primary Examiner—Nancy A. B. Swisher
Assistant Examiner—Donald J. Loney
Attorney, Agent, or Firm—Spencer & Frank

[57] ABSTRACT

A sheet of artificial leather made of polyvinyl chloride the back of which is coated with a dry adhesive capable of being activated by heat. The dry adhesive consisting of the product of the reaction between a substantially linear hydroxypolyurethane derived from a polyester and a partially blocked aromatic triisocyanate in a proportion such that the dry adhesive has an isocyanate value of at least 100. The adhesive may additionally contain polychloroprene. The sheet of artificial leather can be used for thermocovering of rigid articles which are not previously coated with glue, especially dash boards and door panels for motor vehicles made of ABS resin.

9 Claims, No Drawings

SHEET OF ARTIFICIAL LEATHER MADE OF POLYVINYL CHLORIDE, THE BACK OF WHICH IS COATED WITH A DRY ADHESIVE CAPABLE OF BEING ACTIVATED BY HEAT, AND USE OF THIS SHEET FOR THERMOCOVERING OF RIGID ARTICLES

BACKGROUND OF THE INVENTION

1. Field of the Invention

The present invention relates to a sheet of artificial leather made of polyvinyl chloride the back of which is coated with a dry adhesive capable of being heat-activated. It also relates to the use of such a coated sheet capable of being heat-activated for thermocovering of rigid articles.

Description of the Related Art

Sheets of artificial leather made of polyvinyl chloride, which are well known per se, are supple composite sheets with two or three layers produced by coating. They comprise a wear layer, or skin, made of supple polyvinyl chloride, with a surface which is usually decorated by patterning, graining or varnishing, combined with a layer of cellular polyvinyl chloride foam. Where applicable, they comprise a third layer, opposite to the wear layer, also consisting of supple polyvinyl chloride but not decorated, and generally less thick than the wear layer. The said sheets of artificial leather made of polyvinyl chloride find numerous applications in the fields of furnishing, upholstering and padding of rigid articles and, in particular, in the field of trimming rigid articles for motor vehicles, such as dashboards, door panels and rear shelves made of ABS resin. In order to cover such rigid articles by means of artificial leather made of polyvinyl chloride, use is usually made of two-component polyurethane adhesives in an organic solution. The use of such two-component liquid adhesives presents the disadvantage of requiring the application of adhesive to the rigid article to be covered and/or to the back of the sheet of artificial leather made of polyvinyl chloride, just before they are assembled, and this severely complicates thermocovering stations, which have to comprise leakproof and fireproof spraying booths.

SUMMARY OF THE INVENTION

The present invention intends to provide a sheet of artificial leather made of polyvinyl chloride, the back of which is coated with a dry adhesive capable of being activated by heat, which enables the above-mentioned disadvantage to be avoided and which, after heat-activation, adheres perfectly to rigid articles, even those not previously coated with adhesive, such as, for example, articles made of ABS resin, of polyvinyl chloride, of wood or of wood mixtures or of wood derivatives and of polyolefins.

The sheet of artificial leather made of polyvinyl chloride, the back of which is coated with a dry adhesive capable of being activated by heat according to the invention, is characterized in that the adhesive consists of the product of the reaction between a hydroxypolyurethane and a partially blocked polyisocyanate.

Hydroxypolyurethanes or polyurethanes containing hydroxyl end groups, as such, are well-known products. They usually result from the reaction between a diisocyanate employed in a slightly deficient quantity and a polyester or a polyether. Preference is given to substantially linear hydroxypolyurethanes derived from a polyester. By way of examples of such polyesters they may be mentioned those resulting from the esterification of linear alkanedicarboxylic acids, such as adipic acid, with linear alkanediols such as 1,4-butanediol. Generally, the substantially linear hydroxypolyurethanes derived from polyesters which are preferred have a viscosity in a solution containing 15% by weight in methyl ethyl ketone of approximately 0.1 to 1 Pa s, as measured at 23° C. in a Brookfield viscometer (spindle 3, 60 revolutions/minute).

The polyisocyanates which can be used for the manufacture of the heat-activated adhesive according to the invention may be chosen from aliphatic, alicyclic and aromatic di- and polyisocyanates usually employed in polyurethane chemistry. Nevertheless, preference is given, on the one hand, to triisocyanates and, on the other hand, to aromatic polyisocyanates. Polyisocyanates which are most especially preferred are therefore aromatic triisocyanates. An aromatic triisocyanate which is very particularly suitable for the manufacture of the adhesive according to the invention consists of the product of addition of three moles of tolylene diisocyanate to one mole of trimethylolpropane.

The nature of the blocking agents which can be used for the manufacture of partially blocked polyisocyanates is not particularly critical. They may therefore be chosen from the usual blocking agents for the isocyanate group. These are products containing active hydrogen atoms which give rise to a reversible addition reaction with the isocyanate groups:

This equilibrium is formed at a high temperature and is specific to each blocking agent. By way of examples of known blocking agents for isocyanate groups, there may be mentioned phenols, thiols, amines, aldoximes, ketoximes, ε-caprolactam, enols, diketones and esters of hydroxamic acid (hydroxamates). The preferred blocking agents for implementing the present invention are chosen from ketoximes such as, for example, dimethyl ketoxime (acetoxime) and methyl ethyl ketoxime, whose deblocking temperatures lie in the region of 130°–140° C., and the esters of hydroxamic acid, or hydroxamates, such as, for example, benzyl methacryloyl hydroxamate, whose unblocking temperature lies in the region of 110° C. Benzyl methacryloyl hydroxamate forms a specially preferred blocking agent.

The term partially blocked polyisocyanate refers to the polyisocyanates in which 10 to 90% of the isocyanate groups are blocked. According to a preferred embodiment of the invention, polyisocyanates in which 40 to 80% of the isocyanate groups are blocked are used.

Partial blocking of the isocyanate groups does not present any particular problem. The blocking reaction is advantageously carried out in a solvent or a mixture of organic solvents in which the polyisocyanate and the blocking agent are both soluble, and at a temperature which is at least equal to the blocking temperature of the blocking agent employed. It is advisable, furthermore, to carry out the reaction of partial blocking of the polyisocyanate in the absence of oxygen and of traces of water. In practice, it is carried out under dry nitrogen blanketing.

According to a highly preferred embodiment of the invention, the dry adhesive capable of being heat-activated results, therefore, from the reaction between a substantially linear hydroxypolyurethane derived from a polyester and an aromatic triisocyanate which is partially blocked by means of a ketoxime or an ester of hydroxamic acid (hydroxamate) and, still more particularly, an ester of hydroxamic acid.

The hydroxypolyurethane and the partially blocked polyisocyanate may be reacted in variable proportions. Nevertheless, they are preferably reacted with an isocyanate value which is at least equal to 100.

The term isocyanate value is intended to refer to the relationship $$\frac{[NCO]}{[OH] + [NHCO]} \times 100$$

that is to say the relationship between the total number of isocyanate groups in the polyisocyanate (i.e. the sum of the free and blocked isocyanate groups) and the sum of the hydroxyl and urethane groups in the hydroxypolyurethane, multiplied by 100. An isocyanate value equal to 100, therefore, corresponds to the use of the polyisocyanate and of the hydroxypolyurethane in stoichiometric quantities, all the isocyanate groups in the polyisocyanate being taken into account. It is normally useless to employ them with an isocyanate value greater than 200. The isocyanate value is therefore generally between 100 and 200. According to a preferred embodiment of the invention, the isocyanate value is between 120 and 180.

The manufacture of the adhesive is carried out by mixing, usually at ambient temperature, an organic solution of a partially blocked polyisocyanate with an organic solution of a hydroxypolyurethane in suitable proportions, to form a single-component polyurethane adhesive.

According to a preferred embodiment of the invention, the adhesive additionally comprises polychloroprene in a proportion of approximately 5 to 15 parts by weight per 100 parts of hydroxypolyurethane. In this case, a third solution, of polychloroprene, is prepared in an organic solvent such as, for example, toluene, which is mixed in suitable proportions with the solutions of partially blocked polyisocyanate and of hydroxypolyurethane to form a single-component polyurethane adhesive. The adhesive solutions thus obtained have a pot life of some tens of hours.

The application of the single-component polyurethane adhesive solution to the back (cellular layer or undecorated layer made of supple polyvinyl chloride) of the sheet of artificial leather made of polyvinyl chloride can be carried out by any known and suitable means. It is especially advantageous to apply it with a doctor blade, in one or more passes, so as to produce a coating representing approximately 50 to 150 g of solids per square meter. The coating is then dried at a sufficient temperature to evaporate off the organic solvents, but, in any event, below the deblocking temperature of the blocked isocyanate groups, after which the sheet which has been coated with a dry adhesive capable of being activated by heat may be rolled up and stored for several months without any problem.

The present invention also relates to the use of the sheet of simulated leather made of polyvinyl chloride the back of which is coated with a dry adhesive capable of being activated by heat for thermocovering, that is to say covering when hot, of rigid articles such as rigid articles made of ABS resin, of polyvinyl chloride, of wood or of wood mixtures or of wood derivatives (sawdust, fibres) and of polyolefins. The sheet of polyvinyl artificial leather according to the invention is especially suitable for the thermocovering of dash-boards and of door panels for motor vehicles, which are made of ABS resin.

The thermocovering of rigid articles by means of the sheet of artificial leather made of polyvinyl chloride according to the invention does not pose any particular problem. It comprises a stage of heat-activation of the dry adhesive, followed by thermocovering of the rigid article in a manner which is known per se and conventional. The heat-activation of the dry adhesive is performed by heating the sheet of artificial leather or, where applicable, only the face covered with adhesive, to a temperature which is at least equal to, and preferably approximately 10° C. higher than, the deblocking temperature of the blocked isocyanate groups, for a sufficient period of time to cause the said deblocking, and generally of between some tens of seconds and several minutes. The source of heat is then removed and the sheet of artificial leather made of polyvinyl chloride, mounted on a leakproof frame, is then applied in a manner known per se to the rigid article, which has previously been coated with glue and preheated, if appropriate, and is itself applied to a retractable metal countermould with peripheral holes, while vacuum is applied under the rigid article.

The rigid articles thermally covered by means of a sheet of artificial leather made of polyvinyl chloride the back of which is coated with a dry adhesive capable of being heat-activated have a high peel strength which is comparable or even superior to that of identical articles produced by gluing, followed by thermocovering by means of two-component polyurethane adhesives in organic solution.

DESCRIPTION OF THE PREFERRED EMBODIMENTS

The following examples illustrate the invention without, however, limiting it.

In all the examples, the polyisocyanate used is the product Desmodur L75, manufactured and marketed by Bayer, which is in the form of an ethyl acetate solution containing approximately 75% by weight of an aromatic triisocyanate resulting from the addition of three moles of tolylene diisocyanate to one mole of trimethylolpropane. The product Desmodur L75 contains, when analysed, 12% by weight of isocyanate, i.e. 0.29 NCO group per 100 g.

In all the examples, the hydroxypolyurethane employed is the product Desmocoll 400 manufactured and marketed by Bayer. This is a solid, substantially linear hydroxypolyurethane derived from a polyester based on adipic acid and 1,4-butanediol, containing approximately 0.1% by weight of hydroxyl, i.e. 0.006 hydroxyl group per 100 g and, according to analysis, 1.2% by weight of nitrogen, i.e. 0.09 urethane group per 100 g. When dissolved in methyl ethyl ketone at a concentration of 15% by weight it has a viscosity of 0.6±0.2 Pa s, as measured at 23° C. in a Brookfield viscometer (spindle 3, 60 rev/min).

In all the examples, the sheet of artificial leather made of polyvinyl chloride is a two-layer sheet manufactured and sold by Griffine-Marechal under the trade name Formura and consisting of a grain-patterned layer of supple polyvinyl chloride with a thickness of approximately 0.5 mm, combined with a layer of cellular polyvinyl chloride with a thickness of approximately 1.3 mm (backing).

PREPARATION OF SINGLE-COMPONENT ADHESIVE SOLUTIONS

I—Preparation of solutions of partially blocked aromatic triisocyanates (Solution I)

IA—Blocking by means of benzyl methacryloyl hydroxamate (Solution IA)

73.1 g of benzyl methacryloyl hydroxamate (0.38 mole) and 490 g of a 1:1 mixture by weight of xylene and ethylene glycol acetate are introduced, with stirring and under a slight nitrogen pressure, into a two-liter reactor fitted with a stirrer, an evacuation system, and a nitrogen-blanketing system. After the hydroxamate has completely dissolved, 191.9 g of Desmodur L75 polyisocyanate and 245 g of the abovementioned solvent mixture are introduced. After the triisocyanate has dissolved completely, the solution is placed under partial vacuum so as to cause gentle boiling. Atmospheric pressure is restored by blanketing with nitrogen, after which the solution is heated on a water bath at 80° C. for one hour. The solution is then cooled. The solution IA (1000 g) contains a total of 0.56 NCO group blocked to an extent of approximately 68%.

IB—Blocking by means of acetoxime (Solution IB)

Into the same apparatus and under the same conditions of temperature and time as those described above, there are introduced, in the following order: 28 g of acetoxime (98% pure) (0.38 mole) and 450 g of a 1:1 mixture by weight of xylene and ethylene glycol acetate; followed by 198 g of Desmodur L75 polyisocyanate and 265 g of the abovementioned solvent mixture. The solution IB (941 g) contains a total of 0.57 NCO group, blocked to an extent of approximately 67%.

IC—Blocking by means of methyl ethyl ketoxime (Solution IC)

189 g of Desmodur L75 polyisocyanate, dissolved in 450 g of methylene chloride which has been dried over a molecular sieve, are introduced at ambient temperature, with stirring and under a slight pressure of nitrogen, into a two-liter reactor fitted with a stirrer, a system for applying vacuum, a nitrogen blanketing system and a dropping funnel. 35 g of methyl ethyl ketoxime (90% pure) (0.36 mole), dissolved in 75 g of methylene chloride, are then added dropwise so as to limit the temperature rise to 7° C. Stirring is continued for 30 minutes after the addition is finished. Solution IC (749 g) contains a total of 0.55 NCO group which is blocked to an extent of approximately 67%.

II—Preparation of a hydroxypolyurethane solution (Solution II)

200 g of Desmocoll 400 hydroxypolyurethane is dissolved in 800 g of methyl ethyl ketone at ambient temperature. The solution II (1000 g) contains a total of 0.012 hydroxyl group and 0.180 urethane group.

III—Preparation of a chloroprene solution (Solution III)

100 g of Neoprene AD20 polychloroprene, sold by Du Pont, are dissolved in 900 g of toluene at ambient temperature.

The single-component adhesive solutions used in Examples 1 to 4 are prepared by mixing, at ambient temperature, appropriate quantities of a solution I (IA, IB, IC as applicable), of solution II and, where applicable, of solution III. The quantities of solution used in each of the examples are shown in detail in Table I, attached. These single-component adhesive solutions have a pot life of approximately 100 hours.

PREPARATION OF A SHEET OF ARTIFICIAL LEATHER MADE OF POLYVINYL CHLORIDE COATED WITH A DRY ADHESIVE CAPABLE OF BEING HEAT-ACTIVATED

Four 0.5 m$^2$ specimens are cut from a sheet of Formura artificial leather, and their back (foam side) is coated by means of a doctor blade with a coating of 500 g of liquid adhesive per m$^2$ using the adhesive solutions according to Examples 1 to 4. The coatings are dried at 80° C. for five minutes to produce four specimens of sheet of artificial leather made of polyvinyl chloride the back of which is coated with a dry adhesive capable of being heat-activated. The coated sheet specimens may be rolled up and stored without any problem for several months.

HEAT-ACTIVATION OF THE DRY ADHESIVE AND THERMOCOVERING OF AN ABS RESIN DASHBOARD UNIT

The four artificial leather specimens the backs of which are coated with a dry adhesive capable of being heat-activated according to Examples 1 to 4 are mounted, each on a leakproof frame and are positioned with the coated side downwards, above a metal countermould with peripheral holes to which an ABS resin dashboard unit, which has not been previously coated with glue, is applied. Using a source of infra-red rays which is inserted between the sheet of artificial leather and the ABS resin article, the sheet of artificial leather is heated so as to activate the adhesive. The temperature and time of heat-activation, as well as the temperature to which the rigid ABS article is preheated are given in Table II.

The source of heat is then removed and the sheet of artificial leather is applied to the rigid ABS article while a vacuum is produced under the latter.

The resulting ABS resin dashboard units covered with a sheet of artificial leather made of polyvinyl chloride have excellent peel strength, including within the hollows where the draw ratios are high. Table II, appended, gives the results of the evaluation of peel strength, measured by traction on a horizontal Amsler tensometer, according to a method based on the ISO Standard 4578, using 25×100 mm specimens, cut from the units assembled by thermocovering and made of ABS resin and of simulated leather made of polyvinyl chloride.

TABLE I

| | Composition by weight of the single-component adhesive solutions | | | | | |
|---|---|---|---|---|---|---|
| Example No. | Solution IA | Solution IB | Solution IC | Solution II | Solution III | Isocyanate value |
| 1 | 122.8 | — | — | 285 | — | 125 |
| 2 | 122.8 | — | — | 285 | 57 | 125 |
| 3 | — | 122.8 | — | 285 | 57 | 164 |
| 4 | — | — | 100 | 376 | — | 101 |

TABLE II

| Example No. | Heat activation Temperature °C. | Time | Thermocovering Temperature of the article made of ABS resin °C. | Peel strength N/cm |
| --- | --- | --- | --- | --- |
| 1 | 130 | 1 min | 60 | 27.44 |
| 2 | 130 | 1 min | 60 | 42.14 |
| 3 | 130 | 1 min | 60 | 36 |
| 4 | 140 | 1 min | 140 | 46.06 |

What is claimed is:

1. A sheet of artificial leather, comprising: a sheet comprised of polyvinyl chloride one side of which is coated with a dry adhesive capable of being activated by heat, the dry adhesive consisting of the product of reaction between a substantially linear hydroxypolyurethane derived from a polyester and a partially blocked aromatic triisocyanate in a proportion such that the dry adhesive has an isocyanate value of at least 100.

2. The sheet of artificial leather according to claim 1, wherein the partially blocked polyisocyanate comprises a blocking agent selected from the group consisting of ketoximes and esters of hydroxamic acid.

3. The sheet of artificial leather according to claim 2, wherein the aromatic triisocyanate is the product resulting from the addition of three moles of tolylene diisocyanate to one mole of trimethylolpropane and wherein the blocking agent is benzyl methacryloyl hydroxamate.

4. The sheet of artificial leather according to claim 1, wherein the partially blocked aromatic triisocyanate contains from 40 to 80% of blocked isocyanate groups.

5. The sheet of artificial leather according to claim 1, wherein the isocyanate value ranges between 100 and 200.

6. The sheet of artificial leather according to claim 1, wherein the dry adhesive additionally contains polychloroprene in a proportion of approximately 5 to 15 parts by weight per 100 parts of hydroxypolyurethane.

7. The sheet of artificial leather according to claim 1, wherein the dry adhesive is present in a proportion of approximately 50 to 150 g of solids per square meter.

8. The process of thermocovering a rigid article comprised of a material selected from the group consisting of ABS resin, polyvinyl chloride, wood, wood mixtures, wood derivatives, and polyolefins with a sheet of polyvinyl chloride one side of which is coated with a dry adhesive capable of being activated by heat, the dry adhesive consisting of the product of reaction between a substantially linear hydroxypolyurethane derived from a polyester and a partially blocked aromatic triisocyanate in a proportion such that the dry adhesive has an isocyanate value of at least 100, the process comprising:

contacting the rigid article with the side of the sheet of artificial leather which is coated with the dry adhesive while heating to a temperature effective to activate the dry adhesive to cause adhesion of the sheet to the rigid article.

9. The process according to claim 8, wherein the rigid article is one of a dashboard and a door panel for a motor vehicle, and is comprised of ABS resin.

* * * * *